July 19, 1955 A. J. GRANBERG 2,713,272
TEMPERATURE COMPENSATING COUPLING FOR LIQUID METERS
Filed Nov. 16, 1953 2 Sheets-Sheet 1

INVENTOR.
ALBERT J. GRANBERG
BY
Bruce & Brosler
HIS ATTORNEYS

July 19, 1955  A. J. GRANBERG  2,713,272
TEMPERATURE COMPENSATING COUPLING FOR LIQUID METERS
Filed Nov. 16, 1953  2 Sheets-Sheet 2
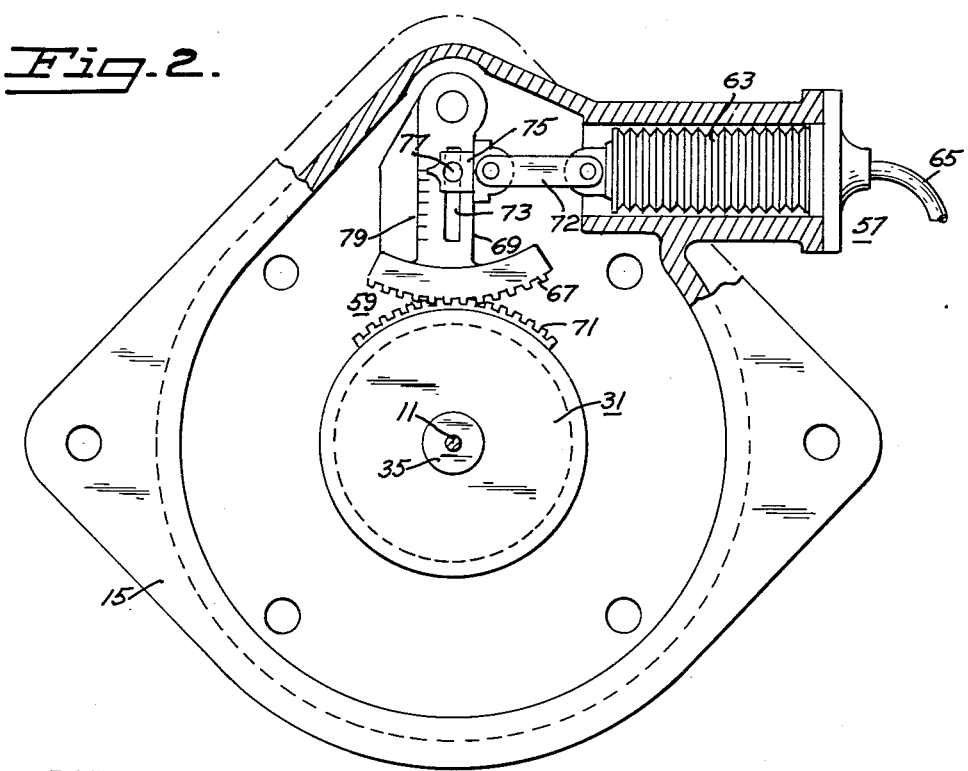
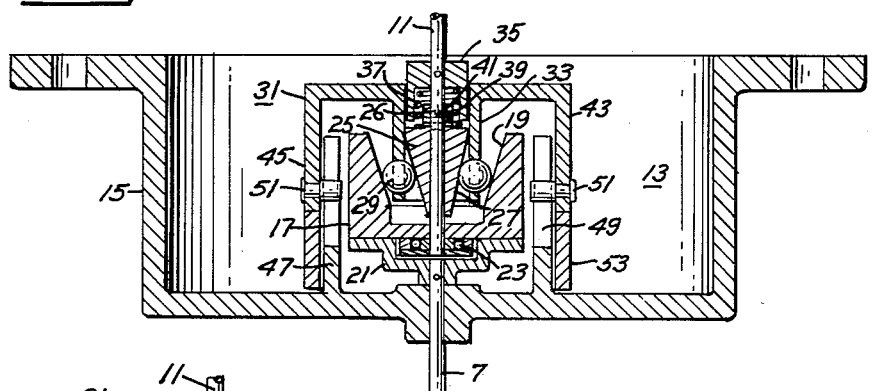
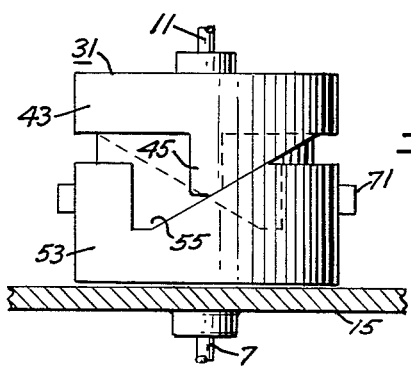
INVENTOR.
ALBERT J. GRANBERG
BY
Bruce & Brosler
HIS ATTORNEYS

United States Patent Office 2,713,272
Patented July 19, 1955

2,713,272

TEMPERATURE COMPENSATING COUPLING FOR LIQUID METERS

Albert J. Granberg, Oakland, Calif.

Application November 16, 1953, Serial No. 392,095

5 Claims. (Cl. 74—190.5)

My invention relates to temperature compensated liquid meters and more particularly to a temperature compensating coupling means for such meters.

In dispensing liquids such as gasoline, oil and the like, the volume thereof changes with variations in temperature of the liquid, the degree of change varying with the characteristics of the liquid, such as specific gravity and coefficient of expansion thereof. Unless otherwise provided for, a liquid meter, while measuring accurately in terms of volume, will not indicate true value in terms of weight or equivalent, at different temperatures. Thus 10 gallons measured at 70 degrees Fahrenheit, when cooled down to some reference temperature, say 60 degrees Fahrenheit for example, will actually be somewhat less than 10 gallons. On the other hand, 10 gallons measured at a temperature under the reference temperature, will actually be more than 10 gallons at the reference temperature. To assure equal value regardless of temperature, it becomes necessary, therefore, to compensate the meter with respect to a reference temperature, so as to always measure a liquid as if it were being dispensed at that temperature.

Among the objects of my invention are:

1. To provide a novel and improved temperature compensating coupling means for liquid meters;

2. To provide a novel and improved temperature compensating coupling means for liquid meters, which is capable of accurately altering the speed ratio between the rotating component of the meter and the recording or counting means, in strict accordance with the volumetric changes brought on by temperature changes in the liquid being measured;

3. To provide a novel and improved temperature compensating coupling means for liquid meters, which can be adjusted to handle liquids of different specific gravity and different coefficient of expansion; and 4. To provide a novel and improved temperature compensating coupling means for liquid meters, which is structurally simple and economical to manufacture.

Additional objects of my invention will be brought out in the following description of a preferred embodiment of the same, taken in conjunction with the accompanying drawings wherein, Figure 1 is a view in elevation, partly in section, of a liquid meter embodying the present invention;

Figure 2 is a view in plan of the temperature compensating coupling incorporated in the meter of Figure 1;

Figure 3 is a view in section through the speed change means forming part of the temperature compensating coupling of Figure 2; and Figure 4 is a view in elevation of the speed change means of Figure 3.

Figure 1:
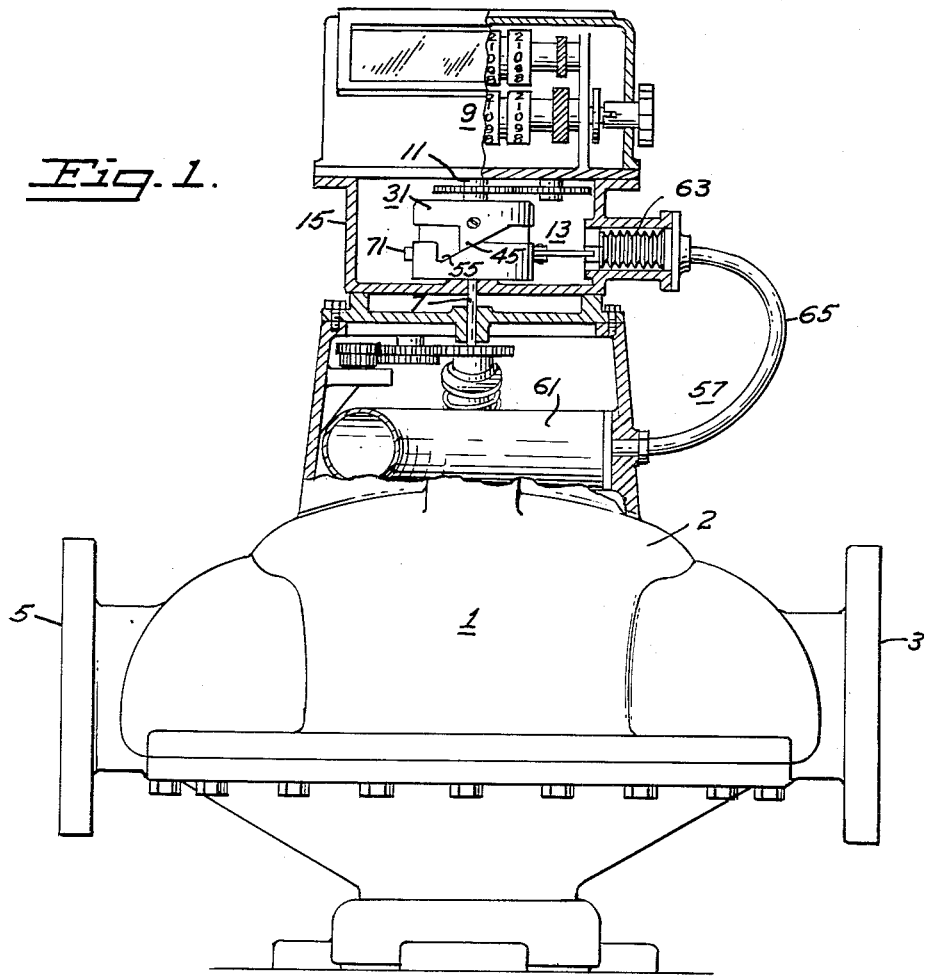

Referring to the drawings for details of my invention in its preferred form, the invention has been illustrated as incorporated in a meter 1 of the positive displacement type. Such meter involves a casing 2 having an input opening 3 and an output opening 5, and in such casing is a rotatable assembly (not illustrated) defining a plurality of compartments and constituting the rotatable component of the meter.

This rotatable component includes a meter shaft 7 which extends upwardly on the axis of the rotatable component and serves to transmit the rotational movement of the rotatable component of the meter to a counting mechanism or counter 9 which serves to record the quantity or amount of liquid flowing through the meter.

Such counter includes a counter shaft 11 which in the absence of temperature compensation, could be coupled directly to the meter shaft. However, where temperature compensation is essential, a temperature compensator coupling 13 serves to couple the meter shaft to the counter shaft, and alter the speed ratio between such shafts to introduce the necessary compensating factor, and thus cause the counter to record the volume of liquid flowing through the meter in terms of what the volume would be at a reference temperature such as 60 degrees Fahrenheit for example.

The temperature compensator of the present invention, as applied to a meter of the type illustrated, involves a cup-shaped housing 15 mounted on the upper end of the meter casing, such housing being flanged to support the counter which is preferably bolted thereto.

In this housing is a speed change coupling involving a cone ring 17 having an interior coned surface 19, such ring being mounted on a cupped flange 21 which is pinned to the end of the meter shaft and thus caused to rotate therewith.

The counter shaft extends down through the center of the cone ring and is anchored to a thrust bearing 23 disposed therebelow in the cupped flange.

Mounted on the counter shaft is a cone sleeve or collar 25 having a neck extension 26 and an external cone surface 27 paralleling that of the cone ring. Between the cone ring and the cone collar are a plurality of balls 29 supported as a ring by a retainer 31 which includes a cylindrical portion 33 extending down between the cone ring and the cone collar, this cylindrical portion having a plurality of holes therethrough in each of which there is carried a ball, with each hole of sufficient size to permit free lateral movement of the ball therein.

To effect driving connection between the cone ring and the collar by way of these balls, the elements must be maintained continually in pressure engagement with each other, and this is accomplished by means of a spring housing 35 pinned to the counter shaft and enclosing a spring 37 in pressure engagement with the upper end of the cone collar. A pin 39 through the neck extension of the cone collar and a slot 41 in the counter shaft, will cause simultaneous rotation of the shaft with rotational movement of the cone collar, while permitting the spring to maintain the desired pressure relationship between the elements.

It will be apparent from the foregoing drive coupling, that any linear movement of the retainer which will change the position of the balls in the spacing between the cone ring and the cone collar, will bring about a change in the speed ratio between the two shafts. To enable such linear movement of the ball retainer, the retainer is provided with a skirt 43 from which depends a saw tooth appendage 45 at diametrically opposite positions therefrom. Adjacent this skirt and formed integral with the coupling housing 15 is a wall 47 preferably cylindrical, and having a deep notch 49 formed in the free edge thereof at diametrically opposite points and in line with the aforementioned appendages. A guide pin 51 extending from each of these appendages into the guide slot adjacent thereto, will permit only linear movement of the ball retainer.

Such vertical movement of the retainer may be brought about by means of a cam wall 53 of the same diameter as the retainer skirt and disposed below the edge of such skirt, such cam wall having its upper edge provided with notches 55 complementary to the saw tooth appendages of the retainer and adapted to receive the same when in alignment therewith. With the cam wall adjusted so that each saw tooth appendage occupies an intermediate position in the proximate notch, it will become apparent that any angular adjustment or movement of the cam wall will cause the retainer to either lift or drop depending on the direction of such shift. If the balls occupy an intermediate position between the conical surfaces to begin with, their position will be raised or lowered accordingly. Thus the counter shaft may be caused to speed up or slow down slightly depending on the direction of adjustment of the cam wall.

The direction and extent of angular adjustment of the cam wall is under control of a temperature responsive means, such as a Sylphon bellows arrangement 57 operating through a gear sector drive 59. The Sylphon bellows arrangement includes a tubular ring 61 disposed in the meter casing 2 in position to be contacted by the liquid flowing through the meter. The tubular ring is connected to a Sylphon bellows 63 mounted in the wall of the compensator, by a connecting tube 65 of relatively small diameter. The ring 61 defines a chamber, which with the bellows and the connecting tube, is filled with a highly volatile liquid such as pure alcohol or benzine, and to a degree which will cause partial expansion of the bellows when the temperature of the liquid in the ring chamber is at the reference temperature. Accordingly, and thereafter, any rise or drop in temperature of the liquid in the ring chamber will manifest itself respectively as a further expansion of the bellows or a retraction thereof.

The gear sector drive involves a gear sector 67 at the extremity of an arm 69 which lies normal to the axis of the bellows and is pivoted to the floor of the compensator housing. The gear sector 67 meshes with a toothed arc 71 affixed to the cam wall 53. By coupling the free end of the bellows to the arm 69 by a link 72, the linear movement of the bellows will be converted to arcuate or angular movement of the cam wall.

If the temperature compensated meter described above were restricted in its use to the metering of one particular fluid, a simple pivotal connection of the link to the proper point on the arm of the gear sector would suffice, but inasmuch as such meters are not restricted in their use to any particular liquid, provision is made for adapting the meter to the metering of various kinds of liquid having different specific gravities and different coefficients of expansion.

With this in mind, the arm of the gear sector is provided with a longitudinal slot 73 for affixing to the arm, a slider 75 to an end of which is pivotally connected the link 72 from the bellows. A locking screw 77 through the slider and arm permits of locking the slider in any one of many adjustable positions. Adjustment of the slider along the arm, will not only alter the angular adjustment of the cam wall slightly, but also the extent of angular movement of the gear sector with expansion or contraction of the bellows. Through prior experimentation with various kinds of liquids, the proper adjustments of the slider may be determined for such liquids, and these may be designated in the form of a scale 79 inscribed on the arm.

It will be apparent from the foregoing, that the invention fulfills all the objects attributed thereto, and while I have disclosed the invention in its preferred form and in considerable detail, I do not desire to be limited in my protection to such details except as may be necessitated by the appended claims.

I claim:

1. A temperature compensator coupling for coupling a liquid meter shaft and a counter shaft in a rotational speed relationship which will vary with temperature, comprising a speed-change drive assembly connecting said liquid meter shaft to said counter shaft, said drive assembly including a cone ring element having an internal conical surface, a cone collar element having an external conical surface paralleling that of said cone ring, one of said cone drive elements being fixedly mounted on said meter shaft and the other of said cone drive elements being slidably mounted on said counter shaft, a plurality of balls, and means for adjustably supporting a ring of said balls between said surfaces, said means involving a retainer having a cylindrical portion disposed between said conical surfaces and a skirt encircling said cone ring element, said cylindrical portion having openings therein, each sufficient to retain a ball and permit lateral movement of said ball therein, and said skirt having a saw-tooth shaped appendage depending therefrom, and means maintaining said cone drive elements and said balls in continuous pressure engagement; means restricting movement of said retainer to a linear movement only, said means including a fixed wall adjacent said skirt and having slots at diametrically opposed points thereof and pins anchored in said skirt and extending into said slots; cam means adapted when actuated, to produce linear movement of said retainer, said cam means including a cylindrical cam wall rotatably supported in edge to edge relationship to said skirt, said cam wall having a complementary notch in the edge thereof facing said saw-tooth appendage to receive the same, said notched wall normally occupying a position with said saw-tooth appendage at an intermediate position in said notch; means responsive to changes in temperature for angularly rotating said cam wall in accordance with the extent and direction of temperature change to produce corresponding linear movement of said retainer whereby to alter the speed change ratio of said drive assembly; and means for adjusting the extent of said angular rotation for a given change in temperature to adapt the meter for the metering of liquids of different specific gravity and coefficient of expansion.

2. A temperature compensator coupling for coupling a liquid meter shaft and a counter shaft in a rotational speed relationship which will vary with temperature, comprising a speed-change drive assembly connecting said liquid meter shaft to said counter shaft, said drive assembly including a cone ring element having an internal conical surface, a cone collar element having an external conical surface paralleling that of said cone ring, one of said cone drive elements being fixedly mounted on said meter shaft and the other of said cone drive elements being slidably mounted on said counter shaft, a plurality of balls, and means for adjustably supporting a ring of said balls between said surfaces, said means involving a retainer having a cylindrical portion disposed between said conical surfaces and a skirt encircling said cone ring element, said cylindrical portion having openings therein, each sufficient to retain a ball and permit lateral movement of said ball therein, and said skirt having a saw-tooth shaped appendage depending therefrom, means restricting movement of said retainer to a linear movement only; cam means adapted when actuated, to produce linear movement of said retainer, said cam means including a cylindrical cam wall rotatably supported in edge to edge relationship to said skirt, said cam wall having a complementary notch in the edge thereof facing said saw-tooth appendage to receive the same, said notched wall normally occupying a position with said saw-tooth appendage at an intermediate position in said notch; and means responsive to changes in temperature for angularly rotating said cam wall in accordance with the extent and direction of temperature change to produce corresponding linear movement of said retainer whereby to alter the speed change ratio of said drive assembly.

3. A temperature compensator coupling for coupling a liquid meter shaft and a counter shaft in a rotational speed relationship which will vary with temperature, comprising a speed-change drive assembly connecting said liquid meter shaft to said counter shaft, said drive assembly including a cone ring element having an internal conical surface, a cone collar element concentrically disposed with respect to said cone ring element and having an external conical surface paralleling that of said cone ring, one of said cone drive elements being mounted on said meter shaft and the other of said cone drive elements being mounted on said counter shaft, a plurality of balls, and means for adjustably supporting a ring of said balls between said surfaces, said means involving a retainer having a cylindrical portion disposed between said conical surfaces, said cylindrical portion having openings therein, each sufficient to retain a ball and permit lateral movement of said ball therein; and means responsive to changes in temperature for producing linear movement of said retainer in accordance with the extent and direction of temperature change whereby to alter the speed change ratio of said drive assembly.

4. A temperature compensator coupling for coupling a liquid meter shaft and a counter shaft in a rotational speed relationship which will vary with temperature, comprising a speed-change drive assembly connecting said liquid meter shaft to said counter shaft, said drive assembly including a cone ring element having an internal conical surface, a cone collar element concentrically disposed with respect to said cone ring element and having an external conical surface paralleling that of said cone ring, one of said cone drive elements being mounted on said meter shaft and the other of said cone drive elements being mounted on said counter shaft, a plurality of balls, including a ball retainer for adjustably supporting a ring of said balls between said surfaces; means restricting movement of said retainer to a linear movement only; and means responsive to change in temperature for producing linear movement of said ball retainer in accordance with the extent and direction of temperature change whereby to alter the speed change ratio of said drive assembly.

5. A temperature compensator coupling for coupling a liquid meter shaft and a counter shaft in a rotational speed relationship which will vary with temperature, comprising a speed-change drive assembly connecting said liquid meter shaft to said counter shaft, said drive assembly including a cone ring element having an internal conical surface, a cone collar element concentrically disposed with respect to said cone ring element and having an external conical surface paralleling that of said cone ring, one of said cone drive elements being mounted on said meter shaft and the other of said cone drive elements being mounted on said counter shaft, a plurality of balls, and means for adjustably supporting a ring of said balls between said surfaces; and means responsive to changes in temperature for producing a linear shift of said ball supporting means in accordance with the extent and direction of temperature change whereby to alter the speed change ratio of said drive assembly.

References Cited in the file of this patent

UNITED STATES PATENTS

| 1,189,109 | Holden | June 27, 1916 |
| 2,222,551 | Ziebolz et al. | Nov. 19, 1940 |

FOREIGN PATENTS

| 164,206 | Austria | Oct. 26, 1949 |